Aug. 7, 1951    G. L. HURST    2,563,651
APPARATUS FOR UNLOADING CARGO THROUGH A HATCHWAY
Filed Oct. 10, 1946    9 Sheets-Sheet 9

Inventor:
Gilchrist L. Hurst
By James R. Hodder
Attorney

Patented Aug. 7, 1951

2,563,651

UNITED STATES PATENT OFFICE 2,563,651

APPARATUS FOR UNLOADING CARGO THROUGH A HATCHWAY

Gilchrist L. Hurst, South Weymouth, Mass.

Application October 10, 1946, Serial No. 702,396

3 Claims. (Cl. 214—15)

My present invention is a novel and improved method of handling articles, particularly bulky or heavy material through a port or hatchway, such as in unloading cargo from a vessel.

In the handling of materials and cargo which are stowed within a vessel, it is customary to have a hatch, or hatches, amidships of the vessel and the cargo is stowed underneath the deck, or decks, at each side and forward and aft of the hatchways, through a selective one of which hatchways the cargo must be loaded and unloaded. In unloading particularly, it has heretofore been customary to move the articles from underneath the main deck by hand and/or by trucks, levers, or otherwise, to substantially the center of the hatchway. Furthermore, the hoisting rope had to be guided by hand to keep the load being handled from catching on the combing.

Such moving of the cargo to substantially the center of the hatchway required a considerable crew or hands and involved hard, heavy labor and a substantial time element; but in my improved method and apparatus for such work, as shown in my prior and copending application Ser. No. 538,386, filed June 2, 1944, now Patent No. 2,448,373, dated August 31, 1948, I have illustrated, described, and claimed certain automatic methods for carrying the cargo to be spotted under the hatchway in substantially a central position.

My present invention may be, and preferably is, utilized in connection with the apparatus of my said prior application, although I can utilize the present invention independently thereof, and certain features of my present method and apparatus can be utilized on ships, storage warehouses, or under other conditions where handling goods through a hatchway by a hoisting rope is essential.

In my present invention, I have developed novel and efficient automatic rope-centering instrumentalities which enable the hoisting rope to be centered through the hatchway and insure clearance of the articles, material, or cargo being hoisted therethrough. This is a most important feature as, heretofore, guide ropes or guys have been employed to handle and steady the article being hoisted through a hatchway, requiring, in the case of a heavy or bulky bundle, a number of stevedores to hold, guide, and steady these ropes, hauling in and slacking them gradually to insure centering of the load being hoisted and to prevent it catching under the combing of the hatchway, to the consequent damage of the articles, hatchway, or even causing breaking of the hoisting rope and consequent injury or damage to the operators as well as the articles involved, or even to the ship. The hoisting rope itself had to be guided by hand, as above noted.

Usually large bulky boxes, crates, or the like are handled individually but a large number of smaller articles are generally assembled in a hoisting net which is arranged to be engaged by the hook of the hoisting rope. Such a hoisting rope, ordinarily a wire of sufficient strength for the heaviest cargo to be handled, is led through a sheave or pulley at the end of the hoisting boom or gaff, which latter is positioned with the hoisting pulley centered over the hatchway. After the articles are hoisted clear of the hatchway, the boom or gaff is then swung over to one side of the vessel, dock, or lighter for lowering and unloading.

This operation requires time and skill and, by prior methods, involves manual guiding of the articles during hoisting as well as afterward for unloading and, furthermore, involves the pulling or shifting of the gaff or boom from its position above the center of the hatchway off to an alignment with the unloading platform, wharf, or spot.

My present invention largely obviates the difficulties above briefly outlined, and by means of my automatic rope-centering device I am enabled to eliminate the manual guiding both of the hoisting rope and the cargo or articles during their hoisting, as well as eliminating or minimizing to a considerable degree the swinging of the gaff or boom after the articles are clear of the hatchway to be lowered for unloading. My invention is equally useful in handling cargo from a side port as well as from a hatchway through the deck.

Also, I am enabled by my present method to largely or entirely eliminate the former manual moving by workmen of a hoisting net filled with articles or a large crate or box from a position underneath the deck and remote from the hatchway to alignment with the hatchway.

This is a most important feature and effects a great increase in speed and facility of handling the cargo as well as saving arduous labor of a plurality of stevedores and skilled workmen.

In carrying out my present invention, I equip the lowermost combing of a hatchway, through which articles are to be hoisted, with rollers arranged so that the hoisting rope may bear against the same from any direction, either widthwise or lengthwise of the hatchway of the vessel and, hence, to permit the hoisting rope to be attached to the articles to be lifted at a point remote from the hatchway underneath the deck, the first hoisting action thereby drawing the net, crate, or box toward the hatchway without manual assistance.

My method thus automatically guides the load from its remote position underneath the deck to hatch-aligning position, the load being, furthermore, accurately spotted centrally of the hatchway by my novel rope-guiding apparatus on the top of the hatch combing. Thereupon, the continued travel of the hoisting rope automatically centers the load, and when the load approaches the top of the hatchway where my rope-guiding apparatus is fitted, the apparatus is automatically released and the hatchway cleared for continued travel upwardly of the load.

Furthermore, by means of my rope-centering device, the hoisting boom or gaff can be set at a considerable angle from the hatchway instead of being in alignment directly over the same and, hence, as the load clears the hatchway it will automatically swing laterally to a position underneath the sheave or pulley on the hoisting boom or gaff and in alignment for the unloading and spotting of the load. Thus, the constant shifting back or forth from hatch-alignment to unloading position is wholly or largely saved, and the facility and speed of operation is greatly increased as well as eliminating largely or wholly the necessity of manning the guy ropes to swing either the boom or gaff, or the load itself, into unloading position.

A further feature of my present invention is an apparatus to take advantage of the normal swinging of the rope-suspended article, and to catch, hold, and release the article considerably beyond the spot where the article would ordinarily be released. This feature is of very general usefulness, being suitable to cooperate with prior hoisting apparatus, as well as with my present novel and improved devices.

Thus, with my cooperating tripping and spotting apparatus, an article when hoisted up from the hatchway sufficiently high to clear the hatch combing, and with the gaff or boom from which the hoisting pulley leads at a substantial angle from the hatchway, the normal swinging of the load at the end of the hoisting rope can be advantageously employed to spot the load at nearly twice the distance of the peak of the boom or gaff from which the hoisting rope is suspended and to catch the load on its extreme limit of its swing to thereupon load and release it at a predetermined spot, as on the adjoining dock, lighter, or other unloading support.

I have discovered that by my present invention, wherein the hoisting rope is led at an angle laterally and for a considerable distance off center from the hatchway, that as the hoisting rope and the load being lifted come up through the hatchway, strike the unlatching lever to release the center guide spanning the hatchway, thereupon the continued upward movement of the load, because of its normal inertia against movement from the line of travel caused by the vertical hoisting through my center guiding members, enables the load to continue its upward flight even though the hoisting rope is at a fairly sharp angle and thus the load will normally continue upwardly and clear the top of the hatch combing before the lateral swinging commences.

This automatic self-clearing feature, eliminating scraping or damage both to the load or hatchway during the rope-hoisting action, even after the center guiding elements have been released and tossed out of the way of the oncoming load, is most important and greatly facilitates the speed of operation and usefulness of my unloading apparatus.

Further important features, advantages, and novel combinations of elements will be hereinafter more fully pointed out and claimed.

Referring to the drawings illustrating preferred apparatus for carrying out my novel method:

Fig. 7 is an enlarged vertical view partly in cross-section showing the rope-guiding and automatic releasing trigger with a slightly modified construction;

As illustrated in the drawings, I have shown my rope-guiding apparatus pivoted directly on the combing or hatchway of a vessel, but I contemplate also providing a unitary framework to fit over a considerable range of different dimensions of hatchways or combings with my apparatus pivoted directly to such framework so that the same can be shifted from one hatchway to another during loading or unloading or from one vessel to another.

Referring to the figures, I designates the hull of a vessel having a deck 2, a floor 3 in the hold, and an open hatchway 5 surrounded by the usual combing 6, which combing is generally rectangular. Suitably secured to the underneath edge portion surrounding the combing below the level of the deck 2 are a plurality of rollers 10—10, as illustrated and claimed in my said prior application Ser. No. 538,386, now Patent No. 2,448,373 granted August 31, 1948. These rollers may be pivotally mounted in suitable brackets attached to the base of the combing 6 or the brackets may be secured to the deck beams 7.

The cargo-handling rope or whip 15 is led through the hatchway 5 and may engage a selective one of the rollers 10 during the loading, unloading, and handling of the cargo within the hold below the deck.

Figure 4:
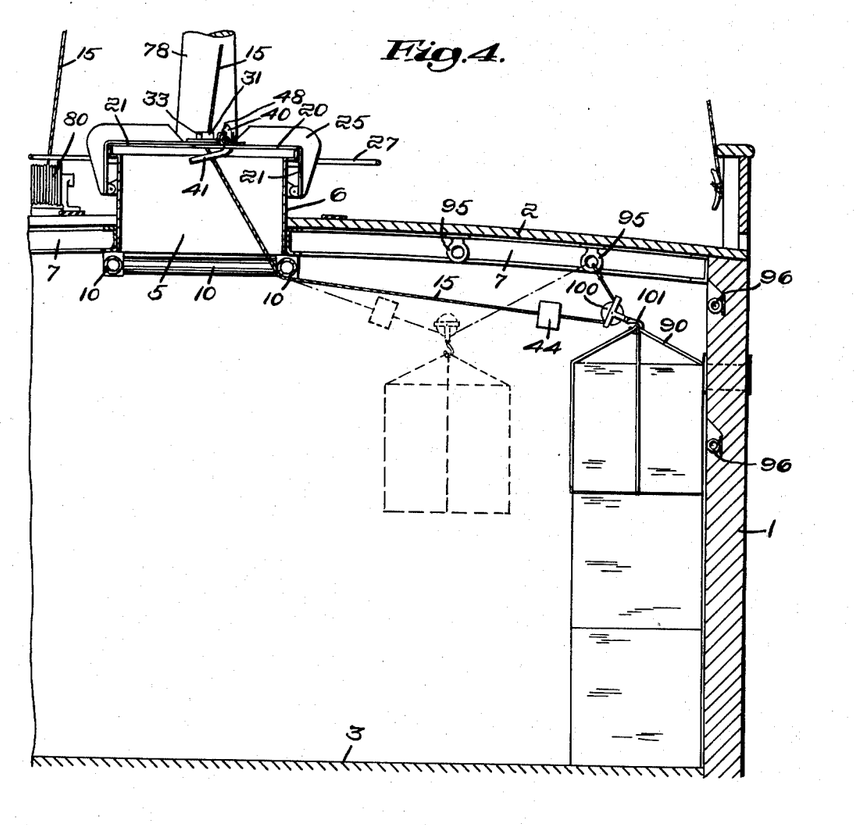
Fig. 4 is a diagrammatic view illustrating further handling steps.
Figure 5:
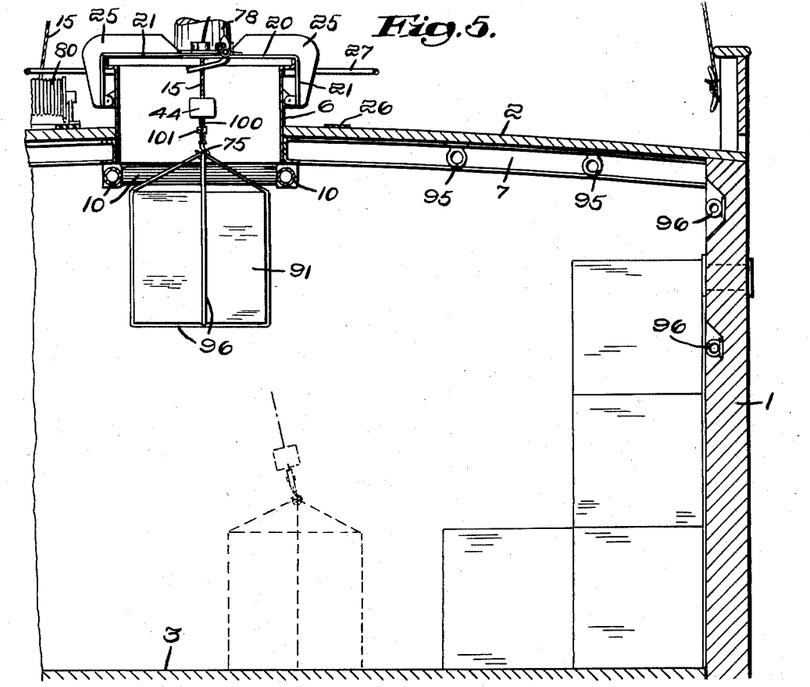
Fig. 5 illustrates a typical unloading hoisting action, centering and guiding the load being hoisted by my novel rope-guiding device.
Figure 6:
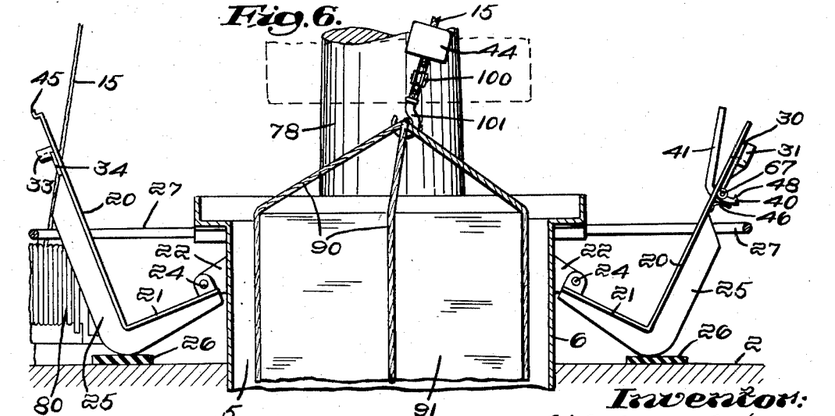
Fig. 6 is an enlarged view partly in cross-section showing the automatic release and removal of the rope-centering and guiding apparatus during the continuous hoisting operation.

My novel rope-guiding apparatus, as shown in Figs. 1 to 6 inclusive, is attached directly to the sides of the combing 6 of the hatchway. This apparatus comprises a pair of cooperating arms, each being of L-shaped formation and having the longer portion 20 of sufficient length to span the width of the hatchway to which they are attached, with the shorter arm 21 of each being pivotally secured to brackets 22—22 by the pivot pins 24 on the opposite sides of the hatchway 6, as best shown in Fig. 6. A reinforcing rib element 25 is welded or integral with each arm to afford strength and rigidity. Suitable plates of rubber or the like 26—26 are fitted on the deck 2 in position to permit the arms to rest thereon and to take up the shock when these arms are unlatched, released, or thrown outwardly during the upward travel of the rope 15 and the attached load as the same passes through the hatchway.

A U-shaped guard, rod, or the like 27—27 is also preferably fitted substantially as shown in the figures. When the guide arms 20 are swung on their pivots, they are of sufficient length to overlap and to carry interlocking rope-guiding elements therebetween. One of the arms is slotted or recessed at its end while the cooperating opposite arm is arranged to fit within said recess, said arms being pivoted diametrically opposite on the sides of the combing and an alignment with each other, as will be appreciated.

These L-shaped arms with the pivot well below the top of the combing provide sufficient leverage for the arms resting on top of the combing to afford rigidity to same against side thrust or other strains.

I provide means to automatically lock these two end portions when they are assembled over the middle of the hatchway and means to automatically unlock and release the same when the hoisting rope, led through appropriate guiding elements, in the interlocking ends of these cooperating arms has lifted the load up to the hatchway and the open top of the hatchway must be cleared to hoist the load therethrough.

Figure 12:
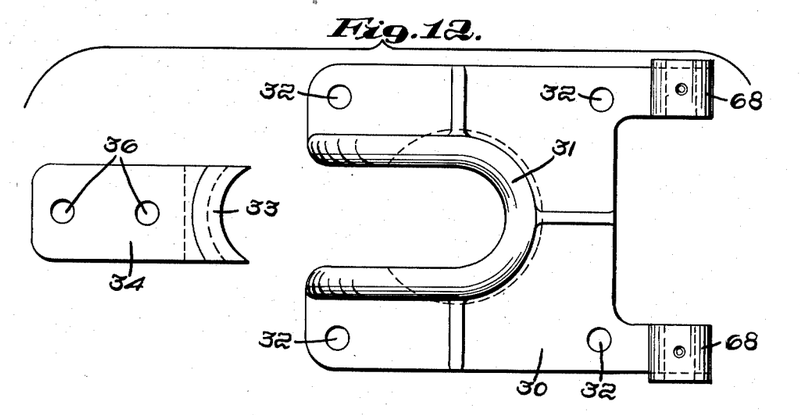
Fig. 12 is an enlarged plan view of the rope-guiding elements in disassembled position.
Figure 13:
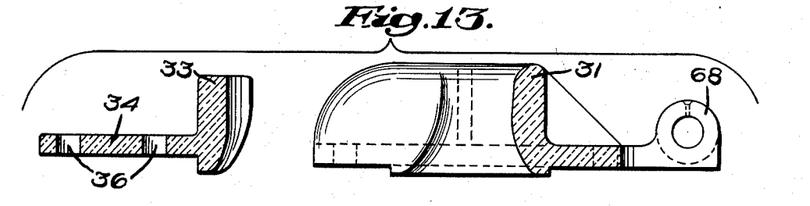
Fig. 13 being a corresponding side elevational view partly in cross-section, and Fig. 14 being a front elevational view of the rope guide.
Figure 14:
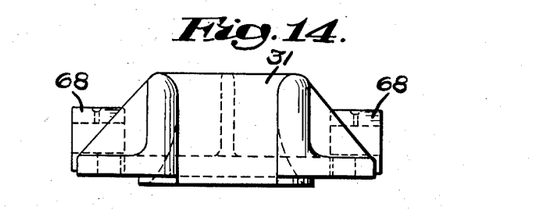

For this purpose, I provide a rope-guiding hub, as best shown in detail in Figs. 12, 13, and 14, said hub being formed in two interlocking elements and bolted respectively to the ends of the opposite arms 20.

As shown in Figs. 12 and 13, a slotted plate 30 is formed with an upstanding rope-engaging flange 31 of U-shaped contour, the plate 30 being arranged to be bolted through openings 32, 32 to the end of the correspondingly slotted arm, shown in the drawings as the right-hand arm of Figs. 1 to 6. To the opposite arm is the cooperating rope-engaging flange 33 and its attached plate 34, having openings 36—36 so that the same may be bolted to the extending part of the opposite arm 20, viz., the left, as shown in said figures.

Thus, when the oppositely pivoted arms 20 are rocked on their respective pivots 24 to position said arms across the open top of the hatchway 5, the respective rope-engaging hub elements 31 and 33 are bolted together in interlocked position, the same being spaced to provide a rounded opening through which the hoisting rope 15 will travel.

To hold the arms in thus interengaged position, I provide a latch pivoted at 67 and having a hook portion 40 and a tail portion 41, the latter extending oppositely to be struck by a releasing ball 44 carried on the hoisting rope 15 and, thus, retract the hook 40 from its locking engagement with the opposite arm. As shown in Figs. 1 to 5, this locking engagement is effected on a hooked portion 45 by the hook 40 catching over the hook portion 45 of the opposite arm, a spring 46 being provided to normally force the hooked end of the latch into this engagement. The top surface of the hooked end 40 is bevelled, as shown at 48, and in position to be struck by the hook 45 as the latter descends downwardly, snapping back the latch and permitting it to return to locking engagement, the arm at the right being lowered first and within the arm at the left, viewing the drawings, thereafter being lowered into position and, thus, automatically locked.

The tail end 41, viz., the releasing element of the latch, is forked so as to straddle the hoisting rope 15 and thus further insure the tripping action of the latch during the raising of the rope and the engagement of the tripping block 44 to release the latch and permit the continued rising action of the hoisting rope to lift the arms 20—20 and throw them backwardly out of the way of the oncoming load being hoisted through the hatchway.

Figure 8:
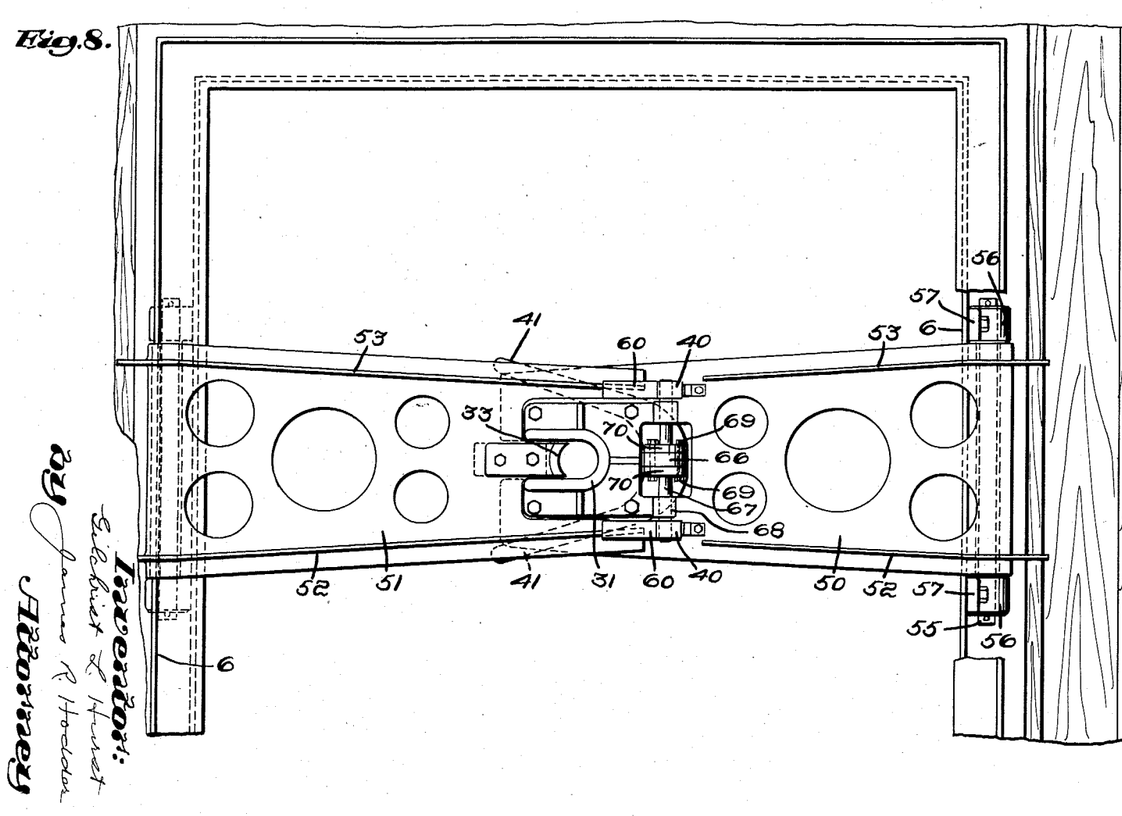
Fig. 8 is a plan view also in enlarged scale corresponding to that of Fig. 7.

I have illustrated in Figs. 7 and 8 in considerable enlarged detail the rope-engaging hub construction and latching device in combination with the slightly modified form of arm.

Referring, accordingly, to Figs. 7 and 8, the pivoted arms are of considerable width to give added strength to the side thrust of the hoisting rope where heavy loads are being handled, and for this purpose the load-carrying L-shaped arm is designated at 50 and the opposite arm at 51, Figs. 7 and 8. These arms have a pair of spaced reinforcing ribs 52—52 and 53—53, the arms and reinforcing ribs having a plurality of open areas to save material and weight, as illustrated. Each of these arms 50 and 51 have their shorter L-shaped portion carrying a welded or tubular element 54 fitted around a shaft 55, which shaft extends lengthwise of the width of the arms and is held in suitable bearings 56—56 formed on a bracket 57 secured to the hatchway combing 6.

As previously noted, this pivotal construction may be attached to the unitary framework which is intended for and adapted to fit over a hatchway for ready attachment to and removal therefrom. In this latter instance, the brackets 57 would be secured to the frame element, which frame could be of considerably greater area than that of the hatchway combing over which it is assembled.

In the form shown in Figs. 7 and 8, the arm with the forked ends carrying the U-shaped hub 31 is shown as attached to the arm 50, which arm is lowered first in position over the hatchway and thereafter the arm 51 carrying the cooperating rope-engaging flange 33 is lowered in position.

In this construction, I prefer to use a pair of hooks 40 for each latch, each engaging a plate 60 extending from the spaced rib 52 on the arm 51, thus affording a latch-engaging construction straddling the rib-engaging hub and giving a quick and even release when the tripping block 44 strikes the forked tail 41 of the latch. In the modified form of Figs. 7 and 8, the pair of tripping latches and the forked tail 41 are adjustably secured together to thus predetermine the time of releasing of each latch 40 on the arm 50 from locking engagement of the plates 60—60 on the arm 51.

As shown in Fig. 8, this adjustable arrangement comprises a central hub 66 formed integral with the spaced tripping tail members 41—41 and mounted loosely on a shaft 67, which shaft is fitted in bearings 68—68 on the flange 30 carrying the U-shaped element 31, as best shown in Fig. 12. A set of bolts 69—69 extending through radially positioned bored openings through flanges 70—70 are keyed or otherwise secured on the shaft 67 for angular adjustment between the trigger portion 40 and the tail portion 41 of the latch, as best shown in Fig. 7. With the arms in outward position, the first arm 50 is lowered, engaging the hoisting rope 15 in the U-shaped hub member 31 and, thereafter, the opposite arm 51 is lowered, the cooperating rope-engaging hub portion 33 sliding in between the U-shaped arms of the hub 31 and thus holding the rope 15 in centered position relatively with the hatch.

The lowering of the arm 51 automatically engages the latches by snapping back the top of each trigger 40, the end of the plate 60 sliding on the bevelled face 48 (see Fig. 7) and thus moving the trigger backwardly against the tension of the spring 46 until the arm 51 is seated in position; whereupon the two arms are thus locked until tripped by the block 44, being lifted by the hoisting rope 50 against the spaced tails 41 which rock the trigger in the reverse direction, releasing the plate 60 and holding the plate thus released until the block 44 lifts both arms upwardly and throws them out of the way of the oncoming load.

While I prefer to utilize a mechanical latching and unlatching arrangement as above described, I also contemplate employing an electrical locking and releasing arrangement. For this purpose, a magnetic clutch or lock would automatically lock the two arms in lowered position and the tripping block or its equivalent could be utilized to de-energize the clutch and thus release the rope-guiding arms.

The hoisting rope 15 is provided with a hook, fastening shackle or the like 75 at its free end and is led upwardly through a sheave 76 swung near the end of a gaff or boom 77 which extends from a mast 78, the hoisting rope 15 being led through a guide block 79 to a winch 80, where the rope is wound or unwound by the operator, the winch being operated by steam or electrical power in any usual manner. The gaff 77 and block 79 are pivotally mounted on a slide 81 to be hoisted at a convenient or desired distance on the mast 78 by suitable halyards (not shown) and is, furthermore, held in desired adjusted position by guy ropes fitted at the peak of the gaff, as indicated at 82, 83, and 84, Fig. 1.

For unloading cargo, the hoisting rope 15 is lowered into the hold, the arm 20 rocked on its pivot over the open top of the hatchway and the cooperating arm 21 is then rocked over with the U-shaped portion 31 catching and engaging the hoisting rope and, thereupon, the cooperating arm 21 is rocked into position with the curved hub portion 33 fitted within the U-shaped arms of the hub 31 and the trigger will lock the two arms in position, as explained.

Figure 1:
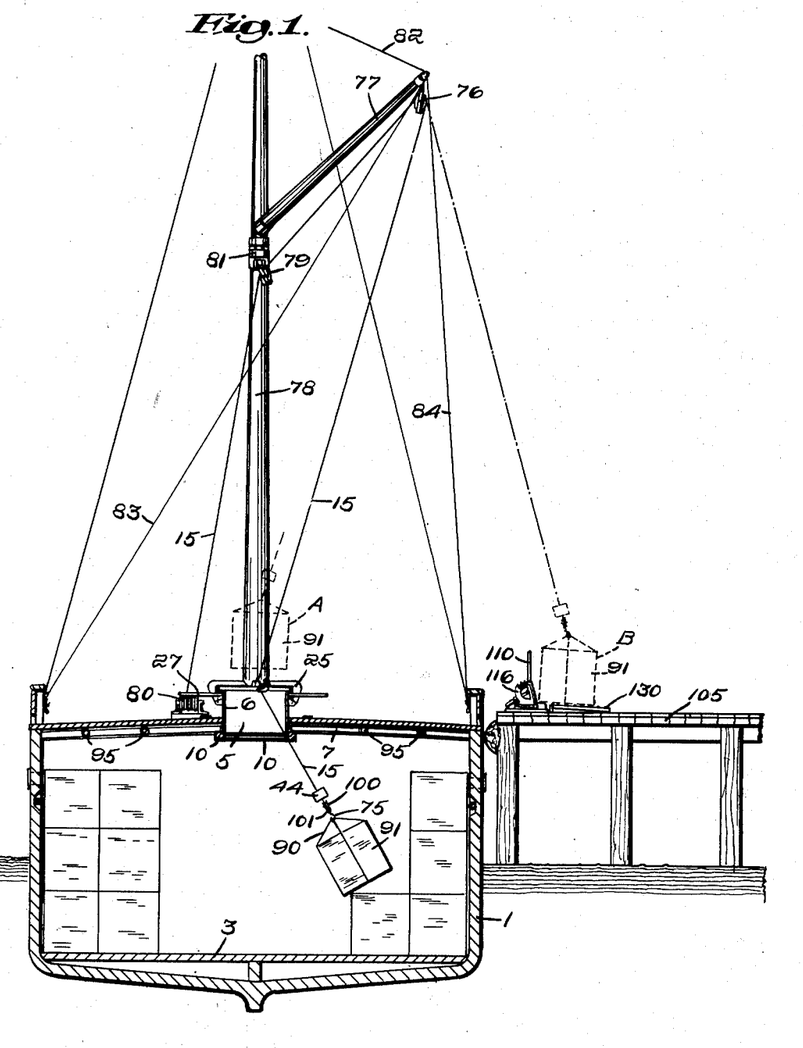
Fig. 1 is a schematic view illustrating my invention.

Thereupon, referring to Fig. 1 for example, a hook 75 may be led at either side remote from the hatchway and engage a sling indicated at 90 around a crate or the like 91, the rope 15 being readily led to a remote distance disaligned from the hatchway for this purpose, passing over the rollers 10; whereupon the hoisting winch 80 is actuated and the crate or article 91 pulled away from its position in the hold and it will swing from the centering and guiding devices 31 and 33.

The load may be dropped down to the floor 3, if desired, to steady and center it or it may be drawn directly upward by the continued hoisting of the rope 15, the same swinging from its centering position over the hatchway, which will shortly steady the article 91 and will automatically guide the same upwardly through the center of the hatchway, the tripping block 44 then tripping the latch and the continued upward movement of the hoisting rope lifting the load clear of the hatchway.

I find that owing to natural inertia during flight and a quick lifting of the load 91, the load will be carried up vertically through the hatchway even though the hoisting rope 15 is at an angle, as shown in Fig. 1. Thus a load will automatically clear the hatchway and the peak of the gaff 77 can be permanently positioned at considerable angle so as to automatically effect a swinging of the load 91 from position A to position B, Fig. 1, without manipulating the ropes 83 and 84 and, hence, saving operators in attendance at these guy ropes; whereupon the operator at the winch 80 quickly releases the hoisting rope 15 when the load has swung to its desired position to be spotted and it is lowered, as shown at B in Fig. 1.

I consider that this feature is of very great importance as it permits high speed of operation in the unloading of cargo, the heavier the load the greater the inertia during its flight travel to insure the lifting of the load above the hatchway before the load starts to swing, even with the hoisting rope being led at a considerable angle to the peak of the gaff which is positioned for spotting the load on the deck, lighter, or wharf at a considerable distance from the hatchway.

This entire advantage is obtained by my novel centering and guiding devices which automatically guide the load from the center of the hatchway and permit a quick and speedy hoisting, unlatching, and removing of the centering guide as a continuous operation. My centering and guiding devices can also be left in position during transfer of the load within the hold, as illustrated generally in Figs. 2, 3, and 4 and 5, thus carrying out the operation of handling cargo underneath the deck, as described and claimed in my prior and copending application.

I provide a plurality of eye-bolts or the like, as indicated, underneath the deck at 95—95 and in the sides of the ship, as shown at 96, into a selective one of which eye-bolts the hook 75 may be fitted, as shown for example in Fig. 4. Thereupon a snatch block 100 having a hook 101 is fitted on the rope 15 and the hook fitted into a sling 90 on a crate which, for illustrative purposes, is shown stacked on a pile on the right-hand side of Fig. 4. Thereupon, a slight hoisting action on the rope 15 lifts the sling 90 and the article enclosed by it, freeing it from the spotted position, and it will travel on the block 100 to a position as shown between the roller 10 and the hook 95 to which the end of the rope is secured. Before fitting on the snatch block 100, the block 44 should be moved along the rope 15 so that, if desired, the block 44 can be left on the rope and hoisted up through the hatchway, the block 44 acting as a tripping means in such case, as indicated at Figs. 5 and 6; or the snatch block can be detached from the rope, in which case the tripping block 44 will slide downwardly in direct engagement with the eye splice attached to the hook 75.

From the position of the load shown in Fig. 4, a lowering of the rope would spot the load on the floor 3 substantially as illustrated in Fig. 5; whereupon the hook 75 is detached from the eye-bolt 95 and fitted into the sling 90 and the hoisting operation through the hatchway performed. Various operations of handling the load for either unloading or stowing can also be performed within the hold with my centering device in position at the top of the hatchway.

Figure 2:
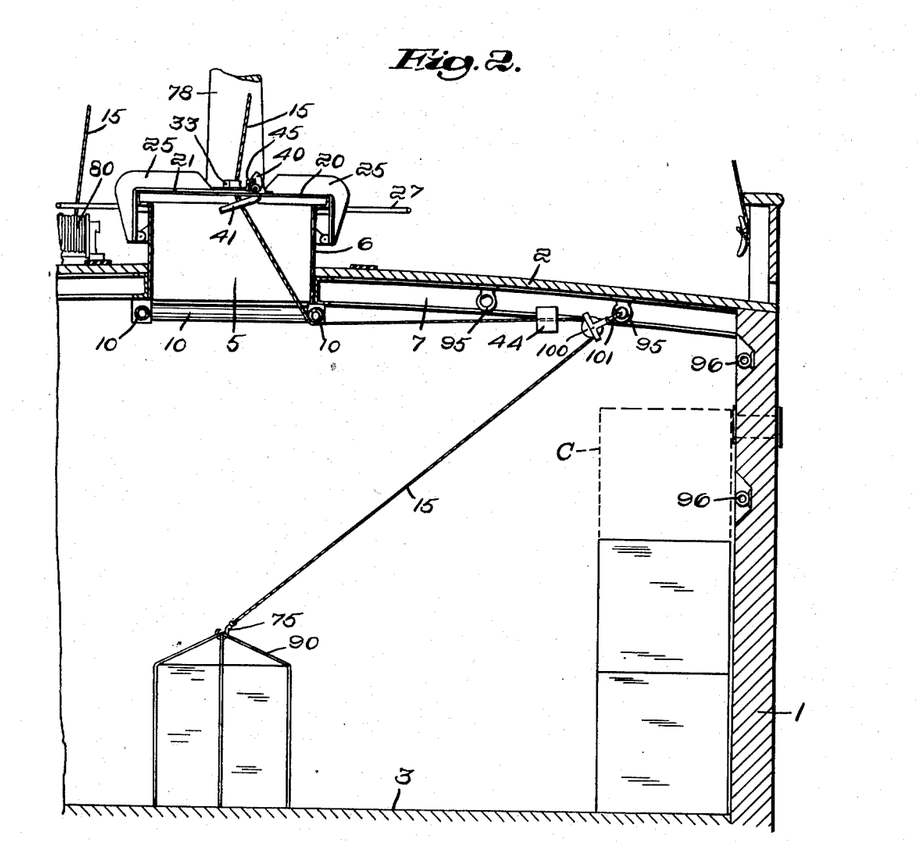
Fig. 2 is an enlarged detail view illustrating the facility for handling heavy articles within the hold of a vessel with my rope-guiding apparatus in operative position.

Thus, for example, referring to Fig. 2, after an article has been lowered through the hatchway as shown, the snatch block 100 can be fitted onto the hoisting rope with its hook 101 into a selective eye-bolt 95, and thereupon the hoisting action on the rope will carry the load to the position desired, and the same can be swung and stowed into dotted line position as indicated at C on top of the previously stowed cargo.

Figure 3:
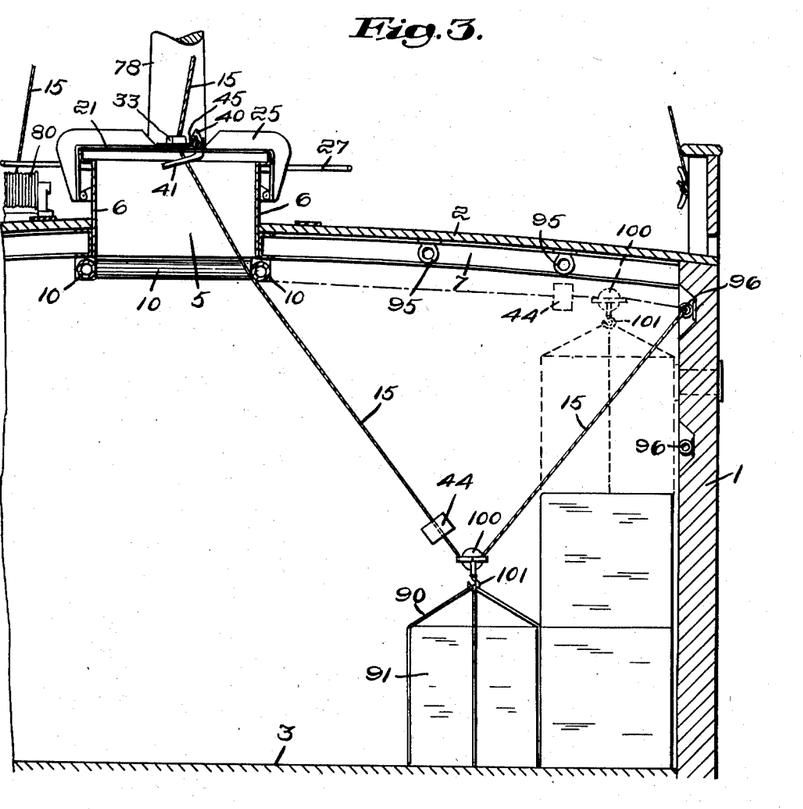
Fig. 3 is illustrative of a further handling operation within the vessel's hold.

In Fig. 3, a further illustrative method of handling cargo within the hold is shown, wherein the hook 75 is fitted in one of the side bolts 96 and the snatch block 100 on the rope 15 is employed, whereby the hoisting of the rope 15 an appropriate distance will lift the load 91 and move the same substantially from the full-line position shown in Fig. 3 to the dotted line position, the load effecting a gravity travel directly into the stowed portion with very slight or no manipulation by attendants.

Figure 9:
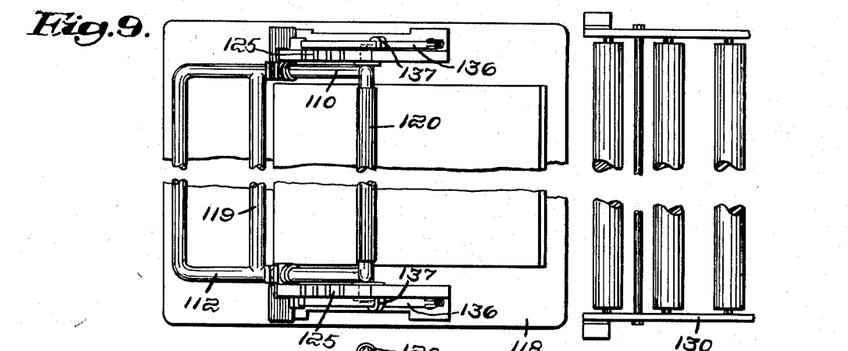
Fig. 9 is a plan view of my novel load-catching and receiving device for receiving the load on a dock, lighter, or other support.
Figure 10:
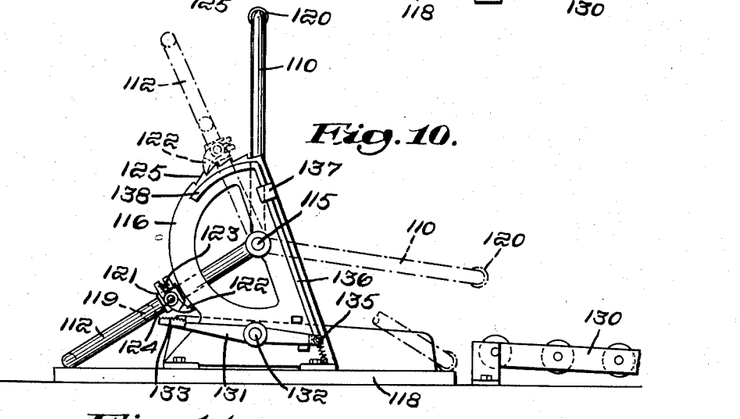
Fig. 10 is a side elevational view of the automatic load-catching and release.
Figure 11:
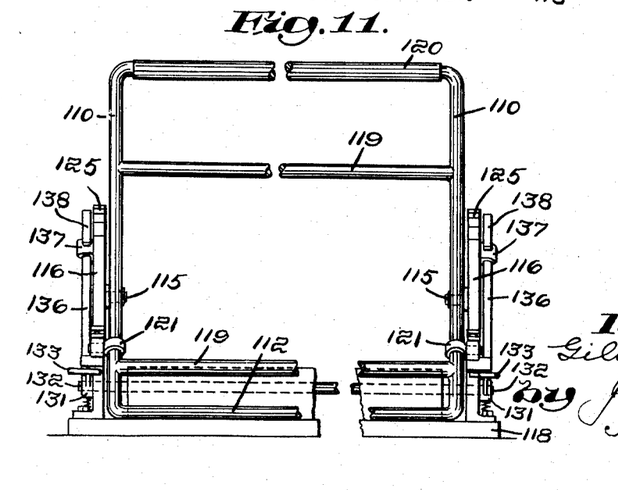
Fig. 11 is a front elevational view of the device of Figs. 9 and 10.

Referring to Figs. 9, 10, and 11, I have illustrated a novel and automatic load-catching apparatus to spot and release the load when it is swung from the gaff 77, permitting the load to be swung to its extreme limit after hoisting out of the hatchway, and thereupon be caught and spotted as on the wharf 105, illustrated in Fig. 1. For this purpose I have devised a framework comprising a pair of angularly positioned U-shaped members 110 and 112 angularly positioned with respect to each other, and pivotally mounted at 115—115 at each side of the width of the frame, said pivotal mounting being in quadrants 116—116 extending upwardly at opposite edges of a base 118, which latter can be secured in position or may be of sufficient weight to effect the tripping and holding operation when the load 91 is swung thereover.

If desired, a brace 119 can be applied to each U-shaped frame near its end, and along the top of the frame 110 I may supply a roller 120 to facilitate the actuation of the device, the roller 120 being intended to be struck by the swinging of the load 90 and rocking the arms 110 and 112 on their respective pivots. Secured to the outside of each arm 112 by a strap 121 is a pivoted latch 122, said latch being normally impelled by a spring 123 to rock said latch on its pivot 124 and to engage the teeth of a ratchet 125 on the top of each quadrant, said spring 123 bearing between a fixed lug on the strap 121 and adapted to rock the latch on the pivot as shown, or in any other convenient manner.

Thus the load 91 swinging to the position in which my novel catching and holding apparatus is fixed, which would be in line with the swing of the load and on the spot desired for unloading, would strike the upstanding U-shaped frame 110, rock it on its pivot, and the lower frame portion 112 would be swung upwardly to dotted-line position, Fig. 10; whereupon the latch 122 would engage the teeth in the ratchet 125 and hold the arm 112 in upright position, preventing the load from swinging backwardly. The U-frame 110 when in depressed position, as shown in dotted lines Fig. 10, the load will slide over the roller 120 and onto a set of gravity rollers, as desired, and as indicated at 130.

In order to quickly release the latch 122 and reset the U-shaped frame into receiving position, I provide a foot treadle 131 pivoted at 132 near the base of each quadrant 116, said treadles having a foot-receiving portion 133 in convenient reach of the operator, and at its other end is pivoted at 135 to an upwardly extending rod 136, which may pass through a guiding strap 137 near the top of the quadrant, and with a laterally extending member 138 to lift the latch 122 from engagement with the teeth in the rack 125 when the operator steps on the foot treadle 133; whereupon the frame is returned to full-line position shown in Figs. 9, 10, and 11 and is set to rock and catch the next load swung thereover.

I claim:

1. Centering and guiding apparatus for a cargo-hoisting rope of the kind described in association with a hatchway, comprising a pair of pivoted cooperating arms having overlapping portions to encircle said rope, means to interlock said arms into rope centering and guiding position relatively to the hatchway, and means actuated by the hoisting rope to automatically unlock said arms and remove the same to inoperative position clear of said hatchway opening.

2. A rope-centering and guiding device for cargo handling through an open hatchway, comprising a pair of cooperating arms, each having one end pivoted adjacent the edge of said hatchway, and the opposite ends adapted to overlap adjacent the center of said hatchway, forming rope-guiding means at the overlapped end portions, means to automatically lock said overlapped ends when in rope-centering position, and means automatically actuated by the hoisting rope to release said lock and move both said arms on their respective pivots into inoperative position to clear the hatchway opening.

3. Rope-guiding apparatus of the kind described for cargo-handling through a hatchway, comprising a U-shaped rope-engaging member, a cooperating member having rope-engaging means to fit within the open end of said U-shaped member and guide a rope therebetween, a lock to hold said rope-engaging members in assembled position, and a block carried by the rope to automatically trip said lock and release and remove the rope-engaging members from obstructing position across said hatchway.

GILCHRIST L. HURST.

REFERENCES CITED

The following references are of record in the file of this patent:

UNITED STATES PATENTS

| Number | Name | Date |
|---|---|---|
| 360,164 | Lavery | Mar. 29, 1887 |
| 819,445 | Morris | May 1, 1906 |
| 1,780,322 | Tsuji | Nov. 4, 1930 |
| 1,901,360 | Snow | Mar. 14, 1933 |
| 1,939,037 | Bogert | Dec. 12, 1933 |
| 2,332,331 | Melling | Oct. 19, 1943 |